(12) United States Patent
Stewart

(10) Patent No.: US 10,709,109 B2
(45) Date of Patent: Jul. 14, 2020

(54) FURNITURE PROTECTING SCRATCHING DEVICE

(71) Applicant: Charles O. Stewart, Show Low, AZ (US)

(72) Inventor: Charles O. Stewart, Show Low, AZ (US)

( * ) Notice: Subject to any disclaimer, the term of this patent is extended or adjusted under 35 U.S.C. 154(b) by 0 days.

(21) Appl. No.: 16/372,748

(22) Filed: Apr. 2, 2019

(65) Prior Publication Data

US 2019/0373858 A1    Dec. 12, 2019

Related U.S. Application Data

(60) Provisional application No. 62/681,760, filed on Jun. 7, 2018.

(51) Int. Cl.
*A01K 15/02*    (2006.01)
*A47C 31/00*    (2006.01)

(52) U.S. Cl.
CPC .......... *A01K 15/024* (2013.01); *A47C 31/004* (2013.01)

(58) Field of Classification Search
CPC .................................................. A01K 15/024
See application file for complete search history.

(56) References Cited

U.S. PATENT DOCUMENTS

| | | | |
|---|---|---|---|
| 2,005,817 A * | 6/1935 | Yoder .................. | A01K 15/024 119/657 |
| 4,177,763 A | 12/1979 | Cook | |
| 4,877,673 A * | 10/1989 | Eckel ................... | B65D 81/054 428/172 |
| D336,033 S * | 6/1993 | Welsh ............................ | D8/403 |
| 5,592,901 A | 1/1997 | Birmingham | |
| 5,619,953 A * | 4/1997 | Griffin .................. | A01K 15/024 119/621 |
| 6,263,630 B1 * | 7/2001 | Bennett ................. | E04F 19/028 52/174 |
| 6,343,569 B1 * | 2/2002 | Buendiger ........... | A01K 15/024 119/706 |
| 6,360,692 B2 * | 3/2002 | Gear ..................... | A01K 15/024 119/706 |
| 6,367,423 B1 | 4/2002 | Scheuer | |
| 6,715,447 B2 * | 4/2004 | Haber .................. | A01K 15/024 119/702 |
| 7,171,922 B2 * | 2/2007 | Lipscomb ............ | A01K 15/024 119/706 |

(Continued)

*Primary Examiner* — Kathleen I Alker
(74) *Attorney, Agent, or Firm* — Boudwin Intellectual Property; Daniel Boudwin

(57) ABSTRACT

A furniture protecting scratching post device. The device includes a base having a pair of sidewalls extending upwardly therefrom wherein the sidewalls are oriented perpendicularly to each other. A top portion is disposed on the upper ends of the sidewalls such that the top portion and the pair of sidewalls define an interior channel. The interior channel is sized to receive the front and side portions of a chair or couch, such that the top portion of the device rests on a front portion of the armrest. A carpeting material is disposed on the base, sidewalls, and top portion. The carpeting material is embedded with catnip to encourage cats to scratch the device rather than the furniture which it is secured to. In this way, the furniture protecting scratching device is adapted to protect an object such as a chair or couch from a cat's scratches.

8 Claims, 4 Drawing Sheets

(56) References Cited

U.S. PATENT DOCUMENTS

| | | | |
|---|---|---|---|
| 2004/0155514 A1 | 8/2004 | Talley | |
| 2005/0039695 A1 | 2/2005 | Deming | |
| 2011/0290198 A1* | 12/2011 | Pemberton | A01K 1/035 |
| | | | 119/712 |
| 2012/0291718 A1* | 11/2012 | Williams | A01K 15/024 |
| | | | 119/706 |
| 2013/0298379 A1* | 11/2013 | Hansen | A01K 15/024 |
| | | | 29/428 |
| 2014/0033985 A1* | 2/2014 | Santiago | A01K 13/00 |
| | | | 119/621 |
| 2014/0251230 A1* | 9/2014 | Go | A01K 13/004 |
| | | | 119/706 |

* cited by examiner

FURNITURE PROTECTING SCRATCHING DEVICE

CROSS REFERENCE TO RELATED APPLICATIONS

This application claims the benefit of U.S. Provisional Application No. 62/681,760 filed on Jun. 7, 2018. The above identified patent application is herein incorporated by reference in its entirety to provide continuity of disclosure.

BACKGROUND OF THE INVENTION

The present invention relates to scratching pole devices and furniture protection. More specifically, the present invention relates to a furniture protecting scratching device meant to be secured around the corner of a couch or other upholstered furniture.

Many cats enjoy scratching different surfaces in an owner's home. One of their favorite areas to do so is with expensive couches, sofas, loveseats, footrests, and other upholstered home furnishings. Unfortunately, this scratching can result in permanent damage of the furniture, such as the shredding of leather, that would potentially require a substantial expenditure of time and money in fixing or replacing the furnishing. Accordingly, a device that is designed to enable a cat to scratch thereupon such that the cat does not cause damage to other objects or surfaces is desired.

Devices have been disclosed in the known art that relate to scratching devices for protecting furniture that include compartments configured to optionally store catnip therein. These include devices that have been patented and published in patent application publications. One of these devices relates to a scratching device for protecting furniture including a protective frame wherein a holding member attaches the protective frame to a piece of furniture in a substantially upright position. Another device relates to a device to prevent animals from chewing on covered areas of the furniture covered by the panels of the invention. These devices in the known art, however, fail to disclose a scratching post device including an interior channel configured to receive a corner of a couch or chair wherein the device further includes a carpeted scratching surface embedded with catnip.

In light of these devices disclosed in the known art, it is submitted that the present invention substantially diverges in design elements from the prior art and consequently it is clear that there is a need in the art for an improvement to existing scratching post devices. In this regard, the instant invention substantially fulfills these needs.

SUMMARY OF THE INVENTION

In view of the foregoing disadvantages inherent in the known types of scratching post devices now present in the known art, the present invention provides a furniture protecting scratching post device wherein the same can be utilized for providing convenience for the user when securing to the corner of an upholstered piece of furniture and encouraging a cat with catnip.

It is therefore an object of the present invention to provide a new and improved furniture protecting scratching device that has all the advantages of the prior art and none of the disadvantages. The present device comprises a planar base having an L-shaped configuration wherein a pair of sidewalls orthogonally extend upward from an interior edge thereon and terminate in a top portion extending over the right angle created by the perpendicular connection of the sidewalls, defining a channel therein. A surface material suitable for scratching with claws covers an exterior side of the planar base, sidewalls, and top portion.

It is another object of the present invention to provide a furniture protecting scratching device wherein the surface material covering the device is comprised of an interwoven carpet-like material having pockets of catnip disposed therein to attract a pet to scratch the device instead of the furniture.

Another object of the present invention is to provide a furniture protecting scratching device wherein a strap is disposed on a bottom portion of the pair of sidewalls to removably affix the device to a leg of a sofa or couch to more firmly secure the device to a piece of furniture.

Yet another object of the present invention is to provide a furniture protecting scratching device wherein varying embodiments of the device have differing dimensions to accommodate furniture of different size as well as surface material.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
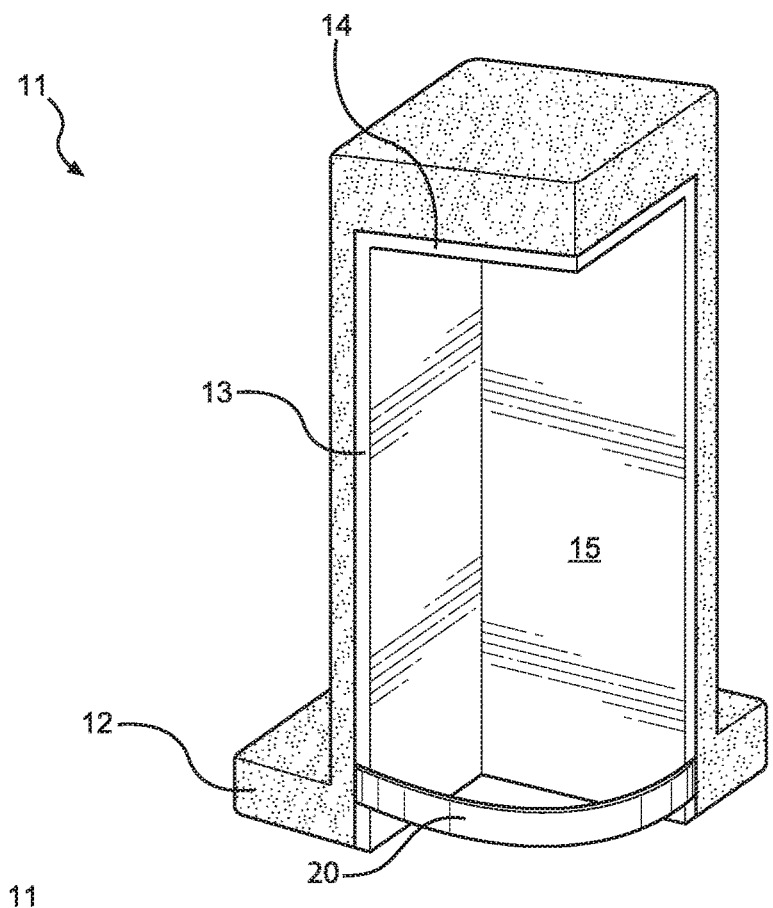
FIG. 1 shows a perspective view of an embodiment of the furniture protecting scratching device showing interior channel

Reference is made herein to the attached drawings. Like reference numerals are used throughout the drawings to depict like or similar elements of the furniture protecting scratching device. For the purposes of presenting a brief and clear description of the present invention, the preferred embodiment will be discussed as used for securing to the corner of an upholstered piece of furniture and encouraging a cat to scratch the device instead of the furniture. The figures are intended for representative purposes only and should not be considered to be limiting in any respect.

Referring now to FIG. 1, there is shown a perspective view of an embodiment of the furniture protecting scratching device showing interior channel. The furniture protecting scratching device 11 comprises a planar base 12 having an L-shaped configuration wherein a pair of sidewalls 13 extend orthogonally upward from an inside edge thereof. The pair of sidewalls 13 connect to each along one side forming a perpendicular connection. A top portion 14 extends orthogonally from a top edge of the sidewalls 13 over an area created by the right angle of the perpendicular connection of the sidewalls. The top portion 14 extends from the sidewalls 13 in a direction opposite of the planar base 12 and defines an interior channel 15 within the sidewalls 13 and top portion 14. This interior channel 15 is sized to fit a corner of a chair or sofa such that the armrest of the chair or sofa is within the interior channel 15 of the furniture protecting scratching device 11 and the sidewalls 13 are covering a portion of a front and side surface of the chair or sofa.

Figure 2:
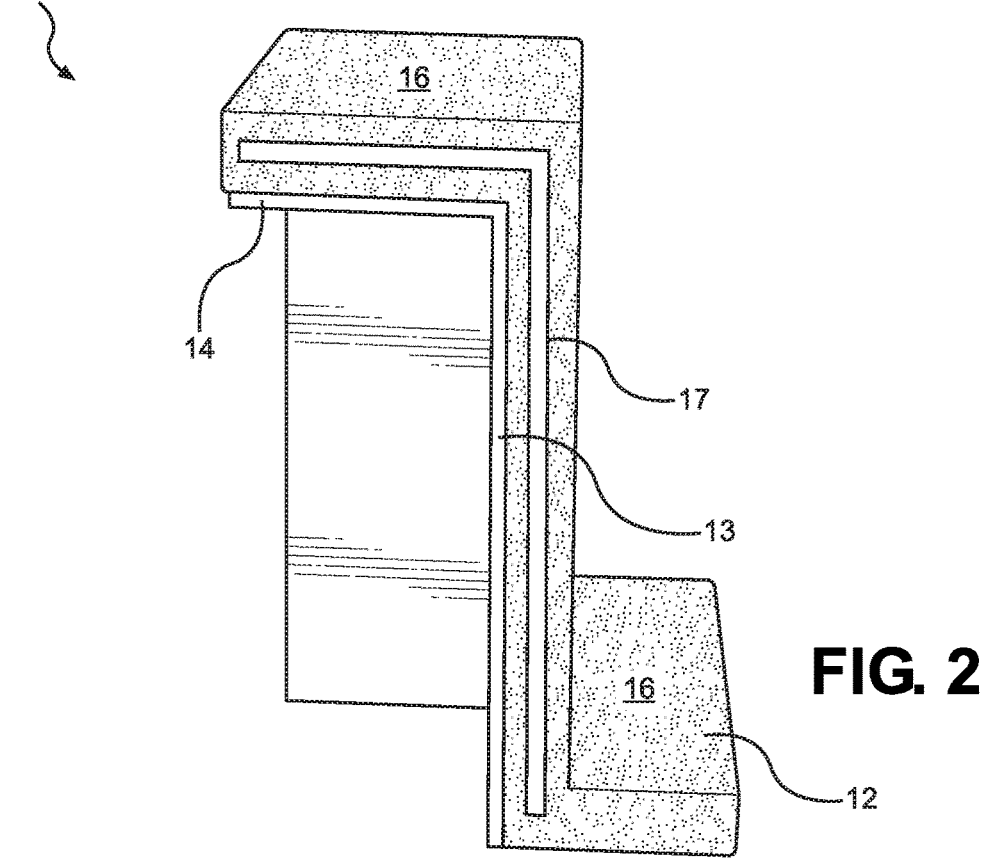
FIG. 2 shows a rear perspective view of an embodiment of the furniture protecting scratching device showing separate layers.

Referring now to FIG. 2, there is shown a rear perspective view of an embodiment of the furniture protecting scratching device showing separate layers. A surface material 16 covers the exterior of the furniture protecting scratching device 11 on the top of the planar base 12 and top portion 14 as well as the outside surface of the sidewalls 13. In the illustrated embodiment, the surface material 16 is comprised of an interwoven carpet-like material suitable for a cat or other domesticated animal to claw at while protecting the furniture from damage caused by a pet's clawing. The surface material 16 is also embedded with an attractor 17 such as Nepeta Cataria, more commonly referred to as catnip, to entice a pet to scratch the surface of the furniture protecting scratching device 11 rather than the piece of furniture it is installed over. In the illustrated embodiment, the attractor 17 is incorporated within the interwoven fabric of the surface layer. In other embodiments, the attractor 17 can be manually incorporated within pockets (as shown in FIG. 3, annotation 22) in the surface material.

Figure 3:
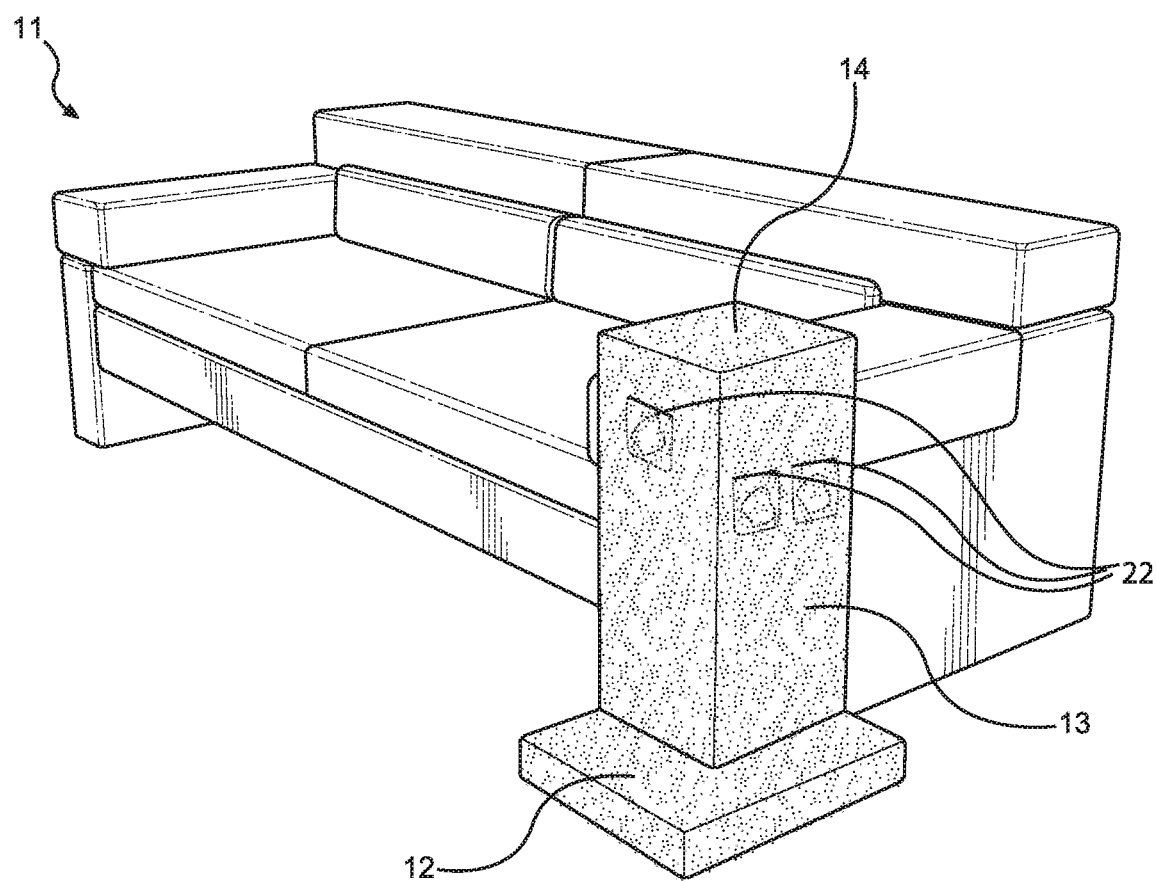
FIG. 3 shows a perspective view of an embodiment of the furniture protecting scratching device installed over the armrest of a couch.
Figure 4:
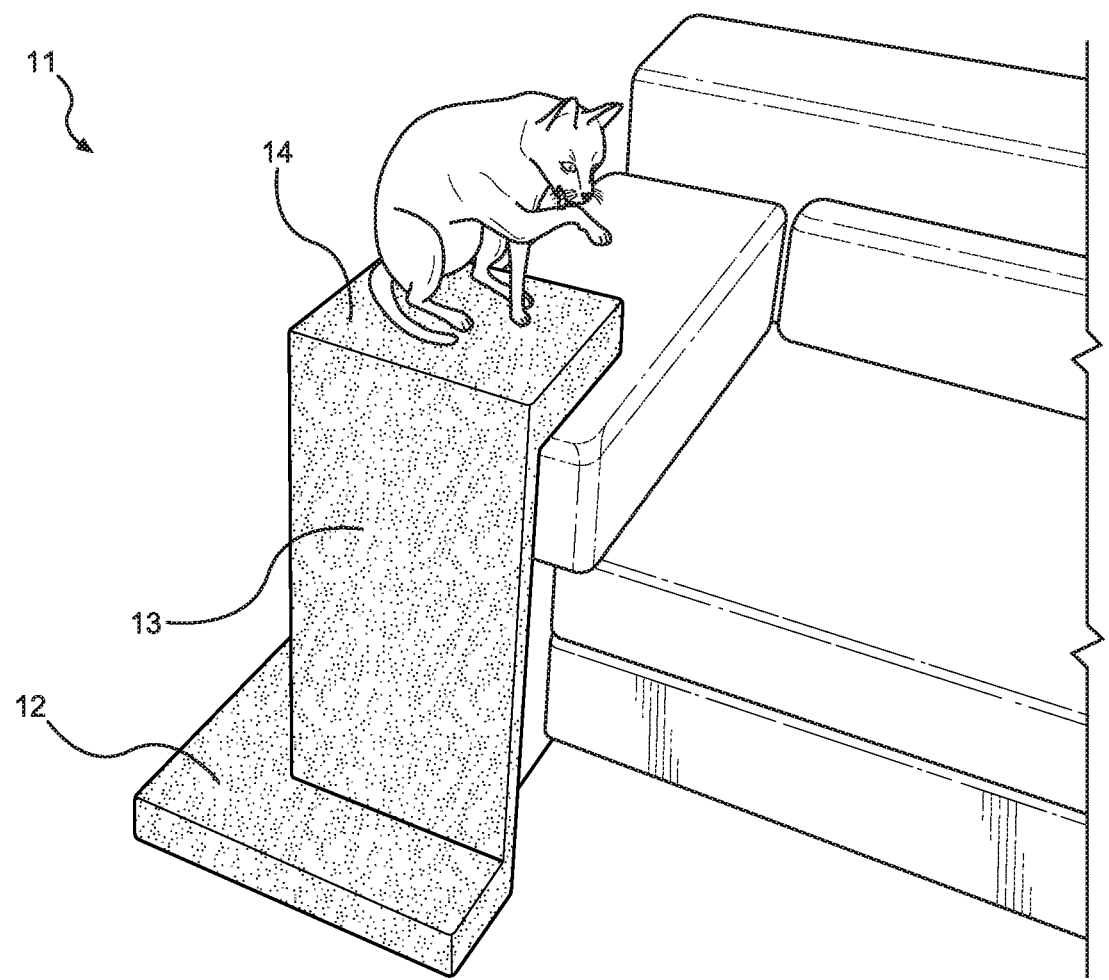
FIG. 4 shows a perspective view of an embodiment of the furniture protecting scratching device installed on the corner of a couch.

Referring now to FIGS. 3 and 4, there is shown a perspective view of an embodiment of the furniture protecting scratching device installed over the armrest of a couch and a perspective view of an embodiment of the furniture protecting scratching device installed on the corner of a couch, respectively. The planar base 12, sidewalls 13 and top portion 14 of the furniture protecting scratching device 11 is made of a rigid construction using any suitable material consisting of wood, plastic, and metal. In some embodiments, a surface of the interior channel is composed of a rubber material adapted to frictionally engage the furniture protecting scratching device 11 with the corner of a chair or couch for a more secure engagement when installed. In practice, the furniture protecting scratching device 11 is removably installed over the end of a piece of furniture wherein the interior channel is dimensioned to receive an armrest/portion of a couch therein, such that the interior channel rests flush against the armrest/portion of couch when the device is in use. In another embodiment, a strap (as shown in FIG. 1, annotation 20) connecting each sidewall is disposed on a bottom portion thereof to removably affix the device around the leg of a piece of furniture.

Figure 5:
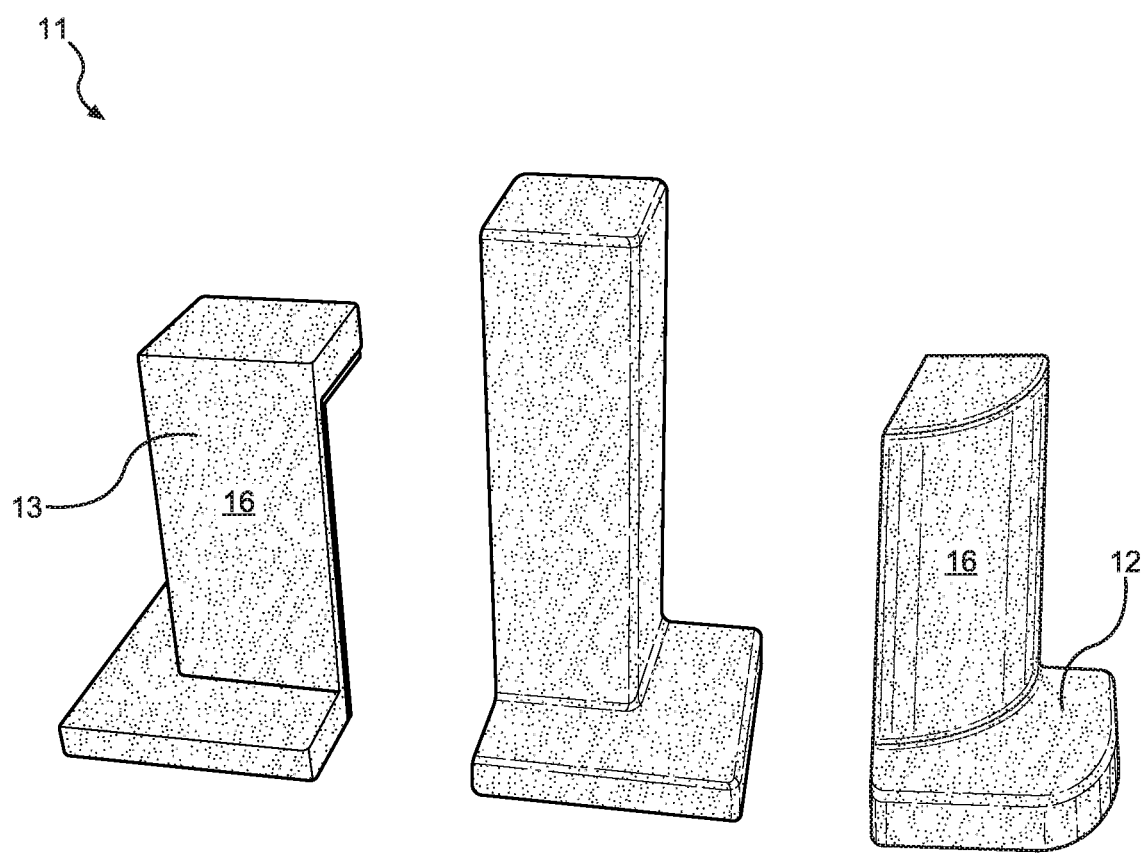
FIG. 5 shows a perspective view of multiple embodiments of the furniture protecting scratching device of varying sizes and dimensions.

Referring now to FIG. 5, there is shown a perspective view of multiple embodiments of the furniture protecting scratching device of varying sizes and dimensions. The sidewalls 13 of the furniture protecting scratching device 11 may be sized to fit common heights of standard couches and reclining chairs. In some embodiments, the surface material 16 may be made out of material suitable for scratching such as corkboard or replaceable pocketed carboard panels wherein catnip and other attractors can be embedded within. Other embodiments may include a planar base 12 having an arcuate shape wherein a curved sidewall defines a partial cylindrical interior channel 15 for fitting over more rounded corners. Further, the furniture protecting scratching device 11 may include other physical attractors such as bells or feather toys which can be used to entice a pet to scratch at the device 11 rather than the furniture it is installed over.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A furniture protecting scratching device, consisting of:
   a planar base having an L-shaped configuration;
   a pair of sidewalls extending perpendicularly upward from an inside edge of the planar base and connected to each other at one end in a perpendicular fashion;
   a top portion extending orthogonally from a top edge of the pair of sidewalls such that the top portion and sidewalls define an interior channel adapted to fit over an armrest portion of a piece of furniture, wherein the interior channel rests flush against the armrest portion of the furniture;
   wherein the top portion extends in a direction opposite the planar base;
   a surface material suitable for scratching disposed on a top surface of the planar base, sidewalls, and top portion;
   the surface material consisting of an interwoven fabric;
   an enticing substance incorporated within the interwoven fabric of the surface material.

2. The furniture protecting scratching device of claim 1, wherein the enticing substance disposed within the surface material comprises Nepeta Cataria.

3. The furniture protecting scratching device of claim 1, wherein the interwoven fabric is an interwoven carpet-like fabric suitable for scratching.

4. The furniture protecting scratching device of claim 1, wherein the planar base, sidewalls, and top portion comprise a rigid material.

5. The furniture protecting scratching device of claim 1, wherein the interior channel defined by the sidewalls and top portion comprises a rectangular cross-section.

6. The furniture protecting scratching device of claim 1, wherein a surface of the interior channel, defined by the sidewalls and top portion, comprises a rubber material to frictionally engage the armrest portion of a piece of furniture of the piece of furniture for better stability when installed.

7. The furniture protecting scratching device of claim 1, wherein the sidewalls are curved, thereby defining a partial cylindrical interior channel.

8. A furniture protecting scratching device, consisting of:
   a planar base having an L-shaped configuration;

a pair of sidewalls extending perpendicularly upward from an inside edge of the planar base and connected to each other at one end in a perpendicular fashion;

a top portion extending orthogonally from a top edge of the pair of sidewalls such that the top portion and sidewalls define an interior channel adapted to fit over an armrest portion of a piece of furniture, wherein the interior channel rests flush against the armrest portion of the furniture;

wherein the top portion extends in a direction opposite the planar base;

a surface material suitable for scratching disposed on a top surface of the planar base, sidewalls, and top portion;

the surface material consisting of an interwoven fabric;

an enticing substance incorporated within the interwoven fabric of the surface material; and a strap is disposed on a bottom portion of the pair of sidewalls to removably affix the device around a leg of the piece of furniture.

\* \* \* \* \*